United States Patent [19]

Youtsey et al.

[11] 4,196,607
[45] Apr. 8, 1980

[54] TUBE REDUCTION APPARATUS WITH INTEGRAL MEANS FOR SENSING WALL THICKNESS DURING A HIGH SPEED TUBE DRAWING OPERATION

[75] Inventors: Karl J. Youtsey; John M. Tatum, both of Decatur, Ala.

[73] Assignee: UOP Inc., Des Plaines, Ill.

[21] Appl. No.: 892,588

[22] Filed: Apr. 3, 1978

[51] Int. Cl.² .................... B21C 1/24; B21C 51/00
[52] U.S. Cl. ................................. 72/34; 72/283; 73/622
[58] Field of Search ............ 72/283, 274, 253, 264, 72/9, 10, 34; 73/622, 625, 628, 641; 29/407

[56] References Cited

U.S. PATENT DOCUMENTS

| 2,213,983 | 9/1940 | Gooding | 72/9 |
|---|---|---|---|
| 2,355,734 | 8/1944 | Katz | 72/283 X |
| 3,426,437 | 2/1969 | Rebhun et al. | 73/622 X |
| 4,099,418 | 7/1978 | Bennett et al. | 73/622 |

Primary Examiner—Milton S. Mehr
Attorney, Agent, or Firm—James R. Hoatson, Jr.; Barry L. Clark; William H. Page, II

[57] ABSTRACT

An improved drawing die apparatus is disclosed for reducing the wall thickness of a thin wall metal tube in cooperation with a floating pin or a fixed mandrel. At least three, and preferably four, wall thickness sensors are positioned in the die body in angular relationship around the outer periphery of a carbide draw die nib for indicating the wall thickness, and thus the eccentricity, of the tubing as it is being produced. Preferably, the sensors are contact type ultrasonic transducers which are acoustically coupled with a viscous couplant to flats formed on the draw nib in regions overlying a land region of the die. The acoustic coupling between the draw nib and tube is achieved through the O.D. drawing lubricant.

13 Claims, 3 Drawing Figures

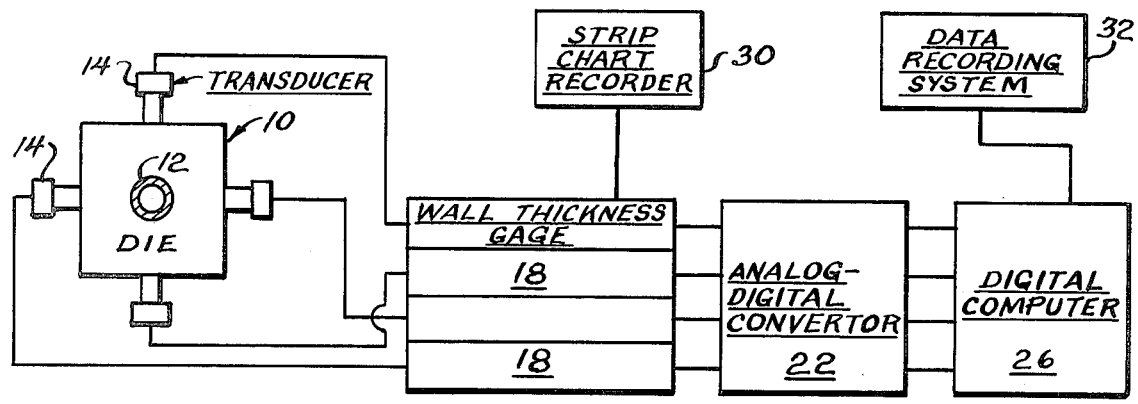
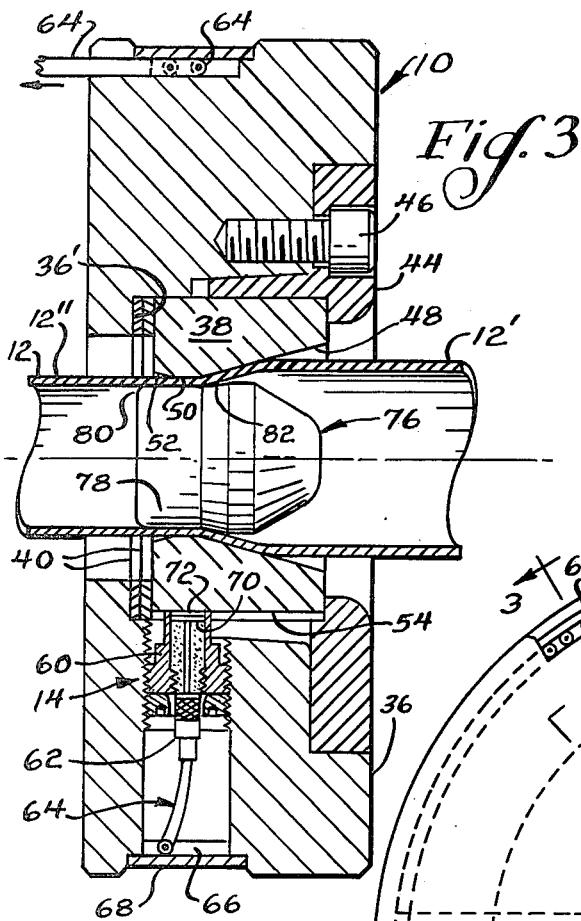
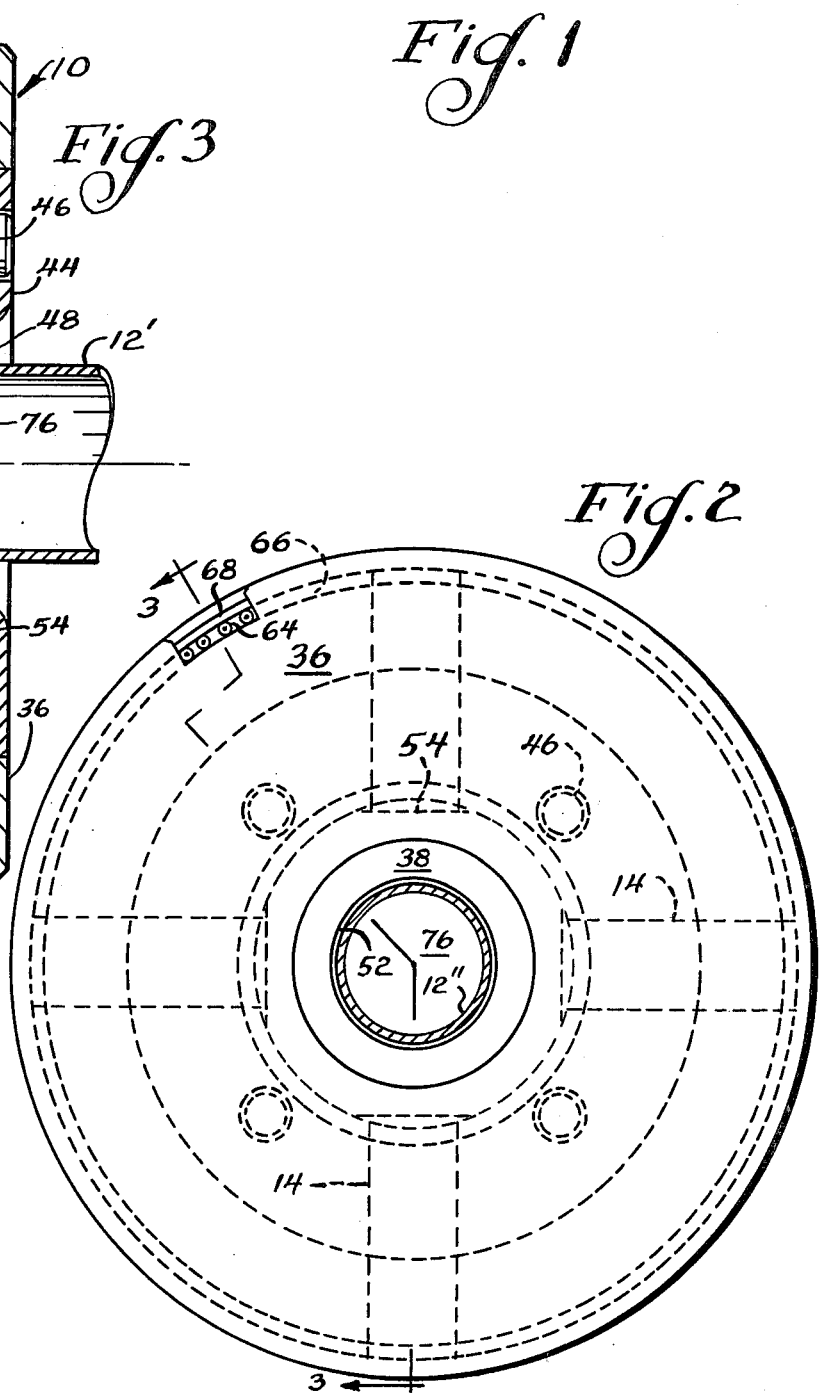

TUBE REDUCTION APPARATUS WITH INTEGRAL MEANS FOR SENSING WALL THICKNESS DURING A HIGH SPEED TUBE DRAWING OPERATION

BACKGROUND OF THE INVENTION

The invention relates to drawing dies and measuring devices. Although devices are known which measure wall thickness and eccentricity, usually by means of ultrasound transducers, such devices generally rely on direct contact with the inner or outer wall of the tube and in many instances require that the tube be immersed in a bath of clean fluid, usually water. The aforementioned class of devices are typically slow moving inspection type devices to which the tube is subjected after it is formed. Such devices merely permit one to tell, after the fact, whether a tube has been made properly. Thus, it is quite possible that a large quantity of inferior product can be produced before there is any knowledge of such fact. Obviously, it would be more desirable to know the instant a tube is being drawn whether it is satisfactory so that corrections can be made to improve the tube produced later or to facilitate the segregation of various lengths or coils of tubing in accordance with their minimum wall thickness, for example. Generally, a given end use for a tube will require a certain minimum wall thickness. Thus, it is obvious that if one can produce tubing whose minimum wall thickness is known to be very close to the average wall thickness, i.e., has very little eccentricity, such tubing will require less metal per unit of length and will cost less to produce. In U.S. Pat. No. 2,213,983, an apparatus for measuring the thickness of a cast metal sheath around a cable is disclosed but such apparatus would have little or no usefulness in connection with a present day tube drawing operation wherein drawing speeds of 1000 feet per minute or more are common.

SUMMARY

It is among the objects of the present invention to provide a die apparatus for drawing a tube while simultaneously measuring tube wall thickness and/or eccentricity continuously as the tube is being drawn at production speeds, thereby eliminating separate inspection operations and providing an instantaneous indication of wall thickness.

It is another object of the invention to provide a drawing die incorporating an ultrasonic tube wall thickness sensing apparatus which permits the transducers to be located a considerable distance from the tube wall and to operate satisfactorily even though the die nib is made of carbide which is attenuative and even though the tube is covered with dirty lubricant containing metal chips and other foreign matter.

The foregoing and other objects are attained by the apparatus of the present invention.

The improved tube reduction apparatus generally comprises a die assembly which is adapted to cooperate with a floating pin or fixed mandrel, preferably a floating pin, to reduce both the outer diameter and the wall thickness of a thin walled metal tube of copper or other metal. The tube reduction apparatus includes a die housing member which may be made of any suitable material, including mild steel, if desired. A draw nib member is preferably formed as an insert which is placed in an axial hollow portion of the die housing and retained therein by a locking ring and retaining bolts. A shrink fit mounting could also be used. Since the draw nib experiences severe frictional contact with the tubes being drawn, it is preferably made of an extremely hard and tough material such as tungsten carbide. A plurality of radial openings in the die housing, preferably four, have direct contact type ultrasonic transducer members threaded into them so that the flat, disc-like, ceramic crystal portions of the transducers will lie immediately adjacent one of the opposed pairs of flat surfaces formed on the external periphery of the draw nib portion. The crystal surface is coated with an electrode formed of a conductive material such as silver applied as a paste and a coating of a viscous coupling material such as Pyrogel is then applied over the electrode to completely fill the space between the crystal and the draw nib. Since carbide is naturally attenuative, it is very important that the acoustic path between the outer diameter of the tube and the transducer crystal be as perfect as possible. Thus, it is sometimes desirable to make the threaded connections between the transducers and the die housing somewhat loose so that the transducers will be able to move slightly in a gimbal fashion about their axes as they are driven against the flats on the draw nib, thus assuring a perfect parallel relationship and positive contact between the ceramic crystals and the flats. It is important that the transducers be positioned radially outwardly of the axially extending land portions of the draw nib. By virtue of the radial contact force between the tube and draw nib at the land portion thereof and the fact that a drawing lubricant is applied to the outside of the tube before it enters the draw nib, a good acoustic coupling will be provided all the way from the transducer crystal to the inside of the tube wall so that each of the transducers will be able to provide a continuous signal representative of the instantaneous wall thickness of the portion of the tube which transverses its axis.

In operation, the wall thickness signals produced by the plurality of transducers are carried by leads attached to the transducers to a plurality of wall thickness gages which transmit the signals to an analog to digital convertor and then to a digital computer whose output may be connected to a data recording system such as a line printer which can provide a permanent record of the exact wall thickness of a particular tube at four points around its periphery and at spaced locations along its length. A continuous visual record of the tube wall thickness is preferably provided by connecting a strip chart recorder to receive the output signals from the wall thickness gages. The recorder could include four pens for simultaneously recording the output of each transducer or it could include a lesser number of pens which could be selectively switched to record the signal produced by any one of the transducers.

BRIEF DESCRIPTION OF THE DRAWINGS

FIG. 1 is a schematic diagram showing the relationship between the various devices which may be used to sense the wall thickness of a tube which is being drawn and record it;

FIG. 2 is an end view of the die assembly of FIG. 3 as viewed from the left side thereof; and FIG. 3 is a side sectional view of the die assembly taken on line 3—3 of FIG. 2.

DESCRIPTION OF THE PREFERRED EMBODIMENT

Referring to the drawings, FIG. 1 illustrates a schematic diagram showing the relationship between a die assembly indicated generally at 10, a tube 12 being drawn through the die assembly 10, and various devices or pieces of equipment which permit the instantaneous thickness of the wall of the tube 12 to be measured at four spaced locations about its periphery. Four ultrasonic transducers 14 are shown as being mounted to the die assembly 10 but other types of thickness sensing equipment could also be utilized such as RF tuned circuits or radiation sensing devices, for example. We have found that 5 MHZ direct contact type sonic transducers sold by Sonic Instruments, Incorporated of Trenton, N.J., under the type CBX-WT perform quite satisfactorily in the present application. The signals produced by the transducers 14 may be fed to wall thickness gages such as the Mark II manufactured by Sonic Instruments, Incorporated. The analog signal output of the wall thickness gages 18 is then preferably transmitted to a conventional analog-digital convertor 22 and the digital output of this device is then transmitted to a digital computer 26 such as the Digital Equipment Corporation Model PDP 8/1. In order to provide a permanent record of the wall thickness of the tube 12 the output of the gages 18 can be transmitted to one or more strip chart recorders 30 such as the Gould Brush Model 220 which can provide a continuous trace of the tube wall thickness as measured by the transducers 14. A data recording system 32 such as a Centronics Model 306C line printer may be connected to the output of the computer 26 to record wall thicknesses of the tube at spaced points around its periphery and at spaced points along its length.

FIGS. 2 and 3 illustrate the die assembly 10 in detail with FIG. 2 being an end view and FIG. 3 being a side sectional view taken on line 3—3 of FIG. 2. The die assembly includes a die body member 36 which may be made of any suitable material including mild steel. The recessed central area 36' in the die body 36 is provided to support a draw die nib insert 38. The die nib insert 38 is the portion of the die assembly which contacts and reduces the diameter of the tubing and is made of a suitably hard and tough material such as tungsten carbide. Although the insert 38 can be mounted in the die body 36 in a shrink fit manner, we prefer to mount it in the adjustable and easily replaceable manner shown in FIG. 3 wherein shims 40 are provided to permit a limited degree of axial adjustment of the draw nib relatively to the die body 36. The draw nib 38 is held in firm engagement within the recess 36' by means of a lock ring 44 and a plurality of retaining bolts 46. Although the shims 40 are both shown on the downstream end of the insert 38, they could both also be positioned at the upstream end or with some of them upstream and some downstream.

The draw nib insert 38 has a tapered generally conical inlet wall portion 48 which has an entrance area larger than the outer diameter of the incoming tube 12'. Immediately downstream of the tapered wall 48 is an axially extending cylindrical wall or land portion 50 which determines the final size of the tube 12 and thus defines its exit diameter 12". Immediately downstream of the cylindrical land portion 50 is a short exit region having relief in the form of a divergent conical surface 52. Formed on the outer periphery of the insert 38 in alignment which each of the transducers 14 is a flatted area 54 which assists in providing an effective acoustic path between the inside wall of tube 12 and the transducer as will be hereinafter described. Although at least three transducers 14 are required to be spaced around the tube 12 in order to permit the tube wall thickness or eccentricity to be measured or calculated, we prefer to use four transducers arranged in opposing pairs positioned at 90° relative to each other. The transducers 14 are mounted in a transducer body 60 which may be threaded into cooperating threads in the die body 36. A coaxial cable connector 62 and coaxial cable 64 extend to each of the transducers 14 and are routed through a recess 66 formed in the outer periphery of the die body 36. The cables or lead members 64 which are retained in the recess 66 by a retaining band or strip 68 are preferably of sufficient length to extend to the wall thickness gages 18 shown in FIG. 1.

The contact type transducers 14 include a thin flat crystal 70 at their inner ends which is electrically grounded and viscously acoustically coupled to one of the flatted regions 54 on the draw nib insert 38. The grounding and coupling is preferably achieved by a thin layer of silver electrode paint, such as G. C. Electronics' No. 21-1, about 1 mil thick which is applied to the crystal and a overlying coating 72 of a viscous, high temperature ultrasonic couplant such as Pyrogel Grade 60 (60 KHZ). As previously discussed, the tungsten carbide material of which the draw nib 38 is preferably made is very attenuative of ultrasonic signals and therefore, it is very important that extremely good contact be maintained between the transducer crystals 70 and the draw nib 38. The flats 54, the electrode coating on the crystal 70 and the viscous couplant 72 all cooperate to insure good acoustic transmission and are aided by manufacturing the transducer body 60 so that its threaded relationship with the body member 36 will be somewhat loose. The loose threaded connection can perform somewhat as a gimbal to permit the flat crystal 70 to align itself in parallel relationship with the flat 54 as the members are screwed together, even when manufacturing tolerances result in either or both of the mating surfaces being slightly skewed from their desired position.

Prior to a drawing operation, a floating mandrel pin 76 is mounted in the leading end of the tube 12' in the usual manner such as by crimping the tube behind the pin after lubricant is injected in the tube. The lead end of the tube is then necked down so it can be easily threaded through the die and engaged by the bull block or other pulling member. The floating pin mandrel 76 includes a straight cylindrical surface 78 which, in use, is positioned under the land portion 50 of the die nib 38 and cooperates therewith to determine the final wall thickness and diameter of the exit portion 12" of the tube 12. The downstream end of the mandrel pin 76 is relieved with a radius as shown at 80 while an outwardly tapered portion 82 is provided immediately upstream of the straight portion 78 to prevent the mandrel pin from being pulled through the die opening. During drawing, the outer diameter of the tube 12 is preferably kept continuously lubricated before it enters the die 38 by a lubricant such as Master Draw No. 586S sold by Etna Products, Inc. of Chagrin Falls, Ohio. This lubricant has an approximate viscosity of 8,000 SSU @100° F. The lubricant which is on the outside of the tube 12 produces a continuous viscous coupling between the die land 50 and the outer wall of the tube 12.

It has previously been noted that the transducers 14 are positioned in radial alignment with the die land portions 50. This positioning is important since a maximum force determining the final wall thickness is exerted by the die on the tube wall at some point along the land area. By positioning the transducers at this point of maximum loading, the best acoustic path will be produced. The aforementioned shims 40 permit a limited degree of axial shifting of the die 38 relative to the transducers 14 and thus help achieve a maximum acoustic signal.

Because of our unique construction, the transducers can function very effectively even though they are positioned internally of the die body 36. Thus, they are protected from the contaminating environment of the normally very dirty lubricant which surrounds the tube being drawn. Compared to conventional ultrasonic transducers which have actual contact with the wall of a tube, the advantages of a remote protected mounting will be readily appreciated. The instant design results in no wear on the transducer from a moving tube and permits lubricants to be used for extended intervals with no critical need to keep the lubricant any cleaner than is customary in a drawing operation. Furthermore ordinary drawing speeds of 1000 feet per minute or more can be used.

We claim as our invention:

1. A tube reduction apparatus for continuously sensing the wall thickness of a tube at various locations around its periphery as it is being reduced in diameter and wall thickness at normal drawing speeds comprising a drawing die assembly including a die body having a die nib member rigidly locked therein, said die nib member having a cylindrical, internal, axially positioned land portion which defines its minimum internal diameter and a generally conical lead-in portion, the internal walls of which smoothly blend into the internal wall defined by the land portion, said lead-in portion and said land portion being adapted to cooperate with both a lubricant coated tube to be drawn which has an outer diameter greater than that of the land portion and with a mandrel located inside the tube to reduce the outer diameter of the tube to a dimension approximately equal to the internal diameter of the land portion, tube wall thickness sensing means including at least three sensing elements located in said die body at angularly spaced positions around the outer circumference of said die nib member in radial alignment with said land portion but spaced therefrom, said sensing elements each being adapted to produce signals representative of the instantaneous wall thickness of the portion of the tube passing inwardly of them, said sensing elements being at all times physically isolated from the tube and lubricant and thus protected from damage by the tube or from contaminating particles in said lubricant.

2. The apparatus of claim 1 wherein said sensing elements comprise ultrasonic transducers.

3. The apparatus of claim 1 wherein said tube wall thickness sensing means comprises four sensing elements.

4. The apparatus of claim 3 wherein said four sensing elements are positioned in two opposed pairs.

5. The apparatus of claim 2 wherein said ultrasonic transducers are of the direct contact type and are mounted in said die body in contact with the outer peripheral surface of said die nib member.

6. The apparatus of claim 5 wherein said die nib member has flat areas formed on its outer surface which are in parallel contacting relation with crystals in said transducers.

7. The apparatus of claim 6 wherein said transducers are threadedly mounted in said die body with sufficient looseness in the threads to permit the transducer body to be moved slightly in a gimbal fashion as the flat crystal end portion thereof is moved into parallel engaging contact with a flat area on said die nib member.

8. The apparatus of claim 5 wherein said die nib member is made of an acoustically attenuative material such as tungsten carbide and said transducers have a flat crystal end portion which is coated with a first outer coating of electrode material and with a second outer coating of a viscous acoustic couplant to provide a grounded contact with said die nib member.

9. The apparatus of claim 8 wherein said electrode material comprises a layer of conductive silver paint and said acoustic couplant is a jelly-like substance.

10. The apparatus of claim 9 wherein said first coating is approximately 1 mil thick and said second coating is approximately 10 mils thick.

11. The apparatus of claim 1 wherein the signals from said sensing elements are transmitted to a plurality of wall thickness gages, the output of which is transmitted to one or more recording devices which may record the sensed wall thickness.

12. The apparatus of claim 11 wherein the signals from said wall thickness gages are first transmitted to an analog-digital convertor then to a digital computer, and simultaneously to a strip chart recorder which displays a continuous trace of the thickness of the wall underneath one or more sensors.

13. The apparatus of claim 12 wherein the signals from said digital computer are also transmitted to a data recording system which provides a permanent record of the wall thickness of the tube being drawn at spaced points along its length and at spaced locations around its periphery.

* * * * *